United States Patent [19]

Mahoney

[11] 3,973,487
[45] Aug. 10, 1976

[54] HIGH SPEED PRINTER FOR PRINTING NON-PRINTABLE CHARACTERS AS SELECTABLY CHOSEN PRINTABLE MATES

[75] Inventor: Ralph W. Mahoney, Telford, Pa.

[73] Assignee: Sperry Rand Corporation, New York, N.Y.

[22] Filed: Feb. 25, 1974

[21] Appl. No.: 445,174

[52] U.S. Cl. ............................ 101/93.29; 340/172.5
[51] Int. Cl.² ............................................ B41J 9/38
[58] Field of Search ............... 101/93, 93.01, 93.14, 101/93.29, 93.21; 340/172.5; 235/60 P, 58 P

[56] References Cited
UNITED STATES PATENTS

| | | | |
|---|---|---|---|
| 2,993,437 | 7/1961 | Demer et al. | 101/93 C |
| 3,289,576 | 12/1966 | Bloom et al. | 101/93 C |
| 3,343,131 | 9/1967 | Bloom et al. | 101/93 C |
| 3,629,848 | 12/1971 | Gibson | 340/172.5 |
| 3,656,427 | 4/1972 | Faley | 340/172.5 X |
| 3,742,845 | 7/1973 | Giani | 101/93 C |
| 3,760,366 | 9/1973 | Gregor et al. | 340/172.5 |
| 3,812,466 | 5/1974 | Rich | 340/172.5 |
| 3,827,357 | 8/1974 | Mahoney | 101/93 C |

Primary Examiner—Edgar S. Burr
Assistant Examiner—Edward M. Coven
Attorney, Agent, or Firm—William E. Cleaver; Sheldon Kapustin; Marshall M. Truex

[57] ABSTRACT

An on line high speed printer is described in which any of a plurality of non-printable characters can be printed as a preselected printable mating character. The printer control system includes a first circuit for detecting the presence of a selected one or group of non-printable characters in a line of data to be printed. A second circuit detects when a preselected printable character on the type member of the printer occupies a print position corresponding to the columnar print position of the detected non-printable character. The second circuit operates when the above condition occurs and actuates the printer and causes preselected printable characters to be printed in the columnar position of the detected non-printable character.

4 Claims, 7 Drawing Figures

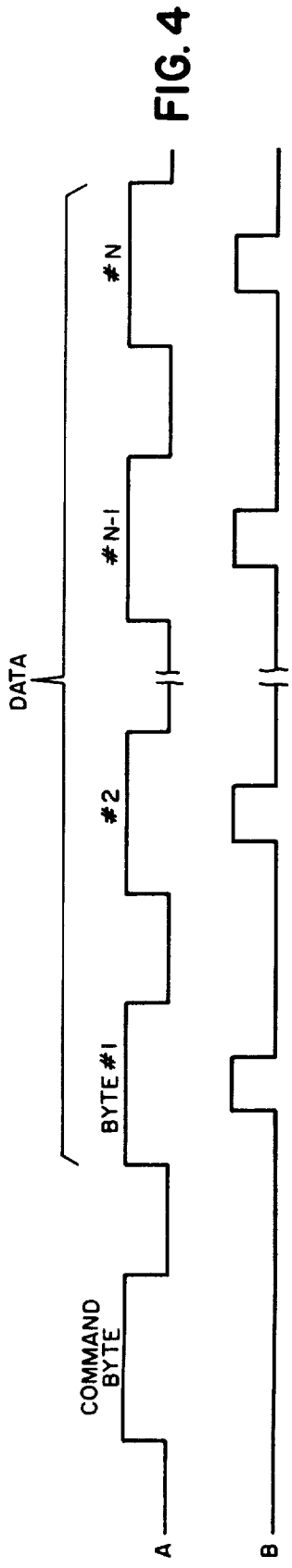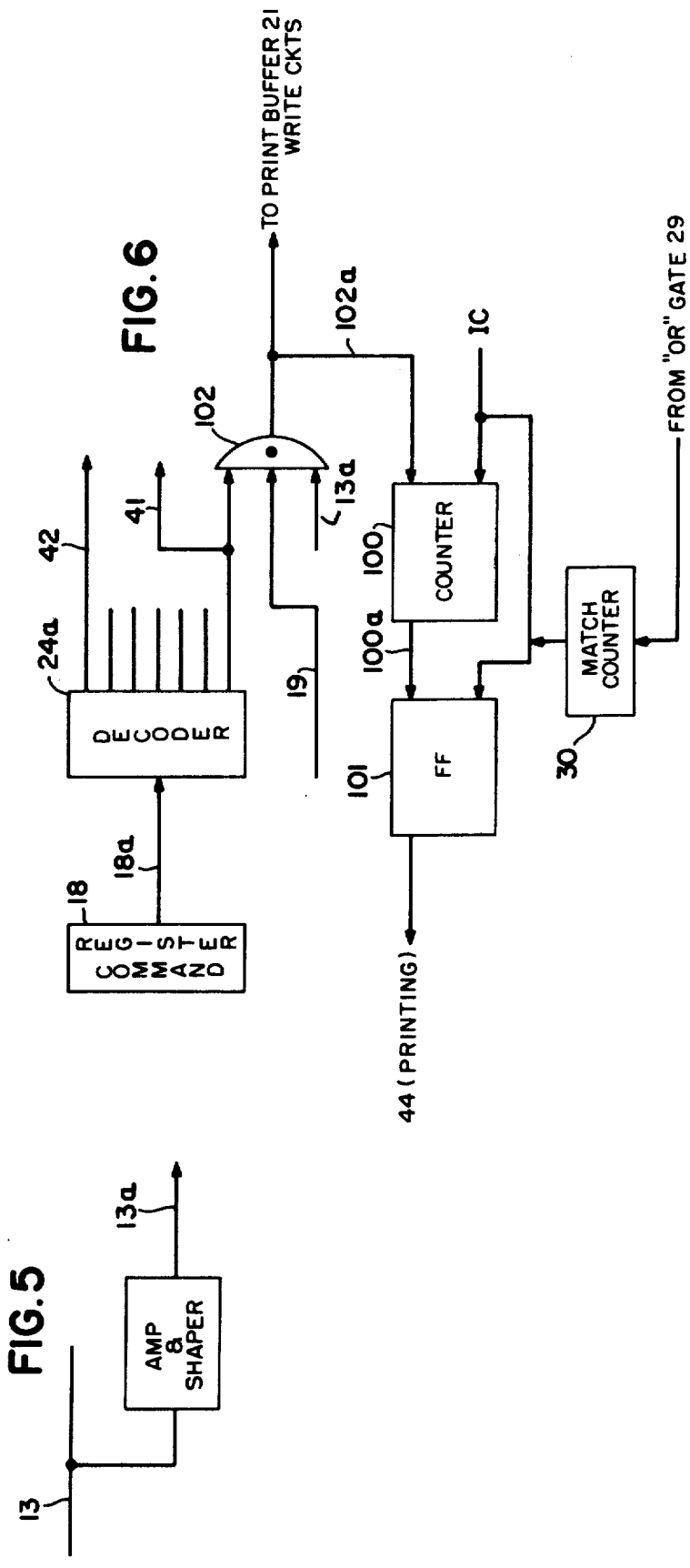

HIGH SPEED PRINTER FOR PRINTING NON-PRINTABLE CHARACTERS AS SELECTABLY CHOSEN PRINTABLE MATES

BACKGROUND

This invention relates to an on-line high speed printer for a data processing system, and in more particular to an improvement over my co-pending application Ser. No. 396,636, filed Sept. 12, 1973.

Printing systems of the type set forth in my above application and also in U.S. Pat. No. 3,289,576 and 3,760,366 generally include an on-the-fly printer mechanism such as a continuously moving band, drum or oscillating bar type member and a control unit which interconnects the printer mechanism to the I/O channel of a central processor unit. The central processor, which may be generally of the type disclosed in U.S. Pat. No. 3,400,371, is under control of an internally stored program which directs the operation of the I/O device, in this case the printer, by sending various commands to the printer control unit. The central processor also supplies the printer with the data to be printed thereby. Typically an entire line of data characters, for example 160 characters, will be transmitted in binary coded form to the printer and stored in a print line buffer memory. The print line buffer memory has as many storage locations as there are columns in a print line, and each binary coded character to be printed in a line is stored in the memory location of the print buffer memory corresponding to its respective columnar position in the print line. The printer also includes a code generator, preferably a code buffer memory such as disclosed in U.S. Pat. Nos. 3,282,205 or 3,349,695 which has as many storage locations as there are characters on the type member. Each location of the code buffer memory has stored therein a binary coded signal, representative of the corresponding character on the type member. During printing the binary coded signals stored in the print line buffer memory and in the code buffer memory are read out in synchronism with the movement of the type member and compared against one another. Specifically, as a character on the type member comes into a printing position the code for that character is read out of the code buffer memory and compared against the code for the character to be printed in that columnar position. When these codes match a print hammer is activated and the corresponding character is printed.

With a system of the foregoing type it frequently occurs that the central processor will utilize, for its data processing activities, certain binary coded characters which are not present on the type member. For example, the central processor may employ say 52 different character codes in the normal processing of data, but the printer may have only 48 print characters in its character set. This means that four of the 52 data characters utilized by the central processor are non-printable. A non-printable character is generally referred to in the art as a data check character and normally appears as a space in the print line. The use of spaces to represent data check characters under certain circumstances is a disadvantage to a programmer since it cannot be determined with reliability what data check character caused a particular space. Indeed, it cannot be determined with reliability which positions are true spaces and which are spaces caused by data check characters. To be more specific by way of example, let us suppose that the information being processed by the computer includes a reference to an aluminum oxide whose chemical notation is AlO. If the type member of the printer device has 26 upper case letters (capital letters), 10 numeric characters and 12 symbols such as parentheses signs, commas, periods, astericks, etc., then the type member would not be able to print a lower case l such as that required to print the chemical symbol for aluminum oxide. Accordingly, the lower case l under these circumstances becomes a non-printable character. The problem that arises is that the user of the computer would like the printer to print something for this small case l so that the user can recognize that the report is referring to aluminum oxide.

In accordance with the present invention, a system is provided whereby the binary code of any printable character may be selectively paired with the code of any one or group of non-printable characters. For instance, in the above example an upper case L could be paired with a lower case l or the numeral one (1) could be paired with a lower case l. Accordingly, whenever the computer attempts to print a lower case l (if it were paired with a capital L), the capital L would be printed and in the second instance given above if the lower case l were to be printed, (if it were paired with the numeral (1)), instead the number one (1) would be printed.

SUMMARY OF THE INVENTION

The present invention adds to a printer system, such as is disclosed in the aforementioned U.S. Pat. Nos. 3,289,576 and 3,760,366 and pending application Ser. No. 396,636, a means for permitting the programmer to cause the printer to print a selected character whenever the print line data contains either the selected character or its mate. In more particular, the novel features of my invention includes, inter alia, a series of storage register pairs which have been added to the printer control unit. The first register of each pair stores the binary code of any selected printable character. The second register of each pair stores the code of any selected non-printable character. The code stored in each second register of the several register pairs is compared against the codes comprising the line of print data from the computer. At the same time the code stored in the first register of each pair of registers is compared against the code representing the currently aligned print character carried by the type member of the printer system. Whenever the first and second comparisons produce a simultaneous match, the character corresponding to the printable character stored in the first register of the register pair producing the match is printed. In addition, means are added to cause the printer to print a common printable character for any other non-printable (data check) character not stored in the second registers of the several pairs. In further addition, the structure of the present invention is organized so that the printer can be selectively placed in any of several modes of operation. For example, in a first mode all non-printable characters appear as spaces. If we consider our example above this would means that each time a small case is generated by the computer to be printed, there would appear a space, i.e., there would be no letter printed. In a second mode, selected non-printables are printed as their mated characters and all other non-printable characters (data check characters) appear as spaces. In further consideration of our example above this would means that each time the "lower case l" was to be printed, there would be printed the numeral one (1) if in fact the numeral one (1) were selected as the mated character for the lower case 1. Also, in this mode of operation, if there were another non-printable character such as a small case e, it could be designated in the printout as a space. In a third mode, selected non-printables are printed as their mated characters and all other non-printable characters (data check characters) are printed as a selected, common data check dual character. In this third mode, and in consideration of our above example, it would mean that the small case l would be printed as a numeral one (1) (assuming that numeral one was the mated character therefor) and all other non-printable characters such as small case e, f, g, etc. would be printed as an asterisk (if in fact the asterisk were chosen as the data check dual character). Finally, when the printer is placed in a fourth mode, all non-printables are printed as a single common data check dual character.

IN THE DRAWINGS

FIG. 1 is a block diagram which illustrates the printer environment in which the present invention may be incorporated;

FIGS. 2 and 3 when taken together comprise a block diagram of my invention as incorporated in the printer system of FIG. 1;

FIG. 4 is a time sequence diagram which illustrates the "load" and/or "print" commands utilized by the present invention;

FIG. 5 is a diagram illustrating one way of generating the strobe pulse in waveform B of FIG. 4;

FIG. 6 is a simplified block diagram of a portion of the control circuits 24 shown in FIG. 1.

DESCRIPTION

Figure 1:
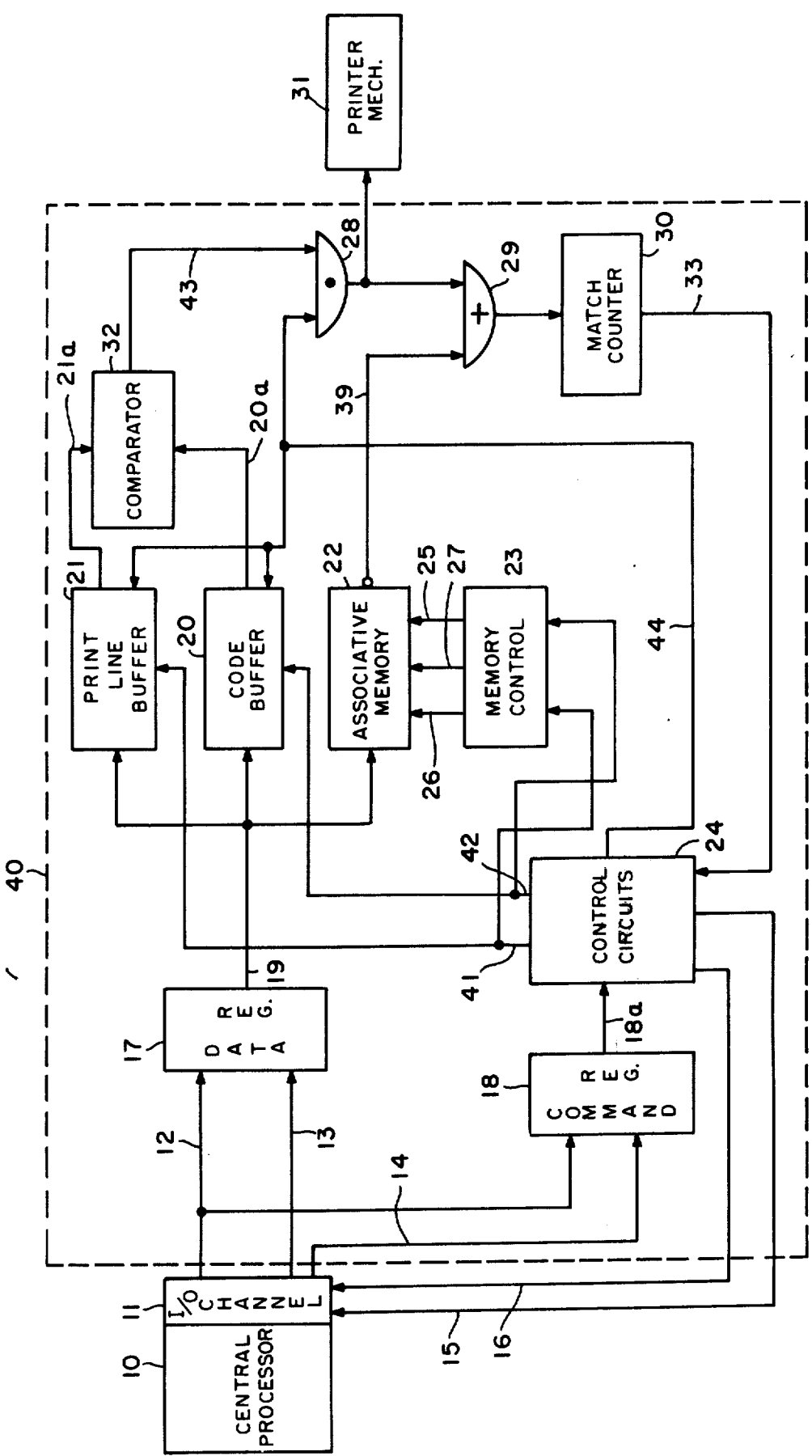

Reference is now made to FIG. 1 wherein the block 10 represents a conventional, internally programmed Central Processor which is equipped with a suitable I/O channel 11. The block 31 represents a conventional printer mechanism such as an on-the-fly printer. The structure embraced by the dashed line block 40 represents a printer control unit for interfacing the printer mechanism 31 to the Central Processor I/O channel 11. The printer mechanism 31, it will be understood, includes a constantly moving type member such as a band; a paper guide and feed mechanism and a set of print hammers and actuators therefor, usually one per column of print on a line. Embossed on the printer band, along its length, is a character font which, typically may be composed of 48 different characters. The 48 character font may be repeated as many as eight times along the band so that the band may, for example, comprise 384 characters (48 × 8) spaced along its length.

The Central Processor 10 and I/O channel 11, as indicated above, is a conventional internally programmed data processing system such as disclosed in U.S. Pat. No. 3,400,371 and it supplies both data and commands to the printer control unit 40 over a data bus 12. The data bus 12 typically, comprises eight parallel signal lines over which an eight bit binary coded data character or command signal may be transmitted from the I/O channel 11 to the printer control unit 40. The eight bits forming the data character or command signal are referred to as a signal byte and are transmitted from the I/O channel 11 to the printer control unit 40 one byte at a time in series. Included within the control unit 40 are a pair of conventional eight bit flip-flop registers 17 and 18 each of which has its inputs connected to the bus 12. A first control line 13 from the I/O channel 11 is connected to the data register 17, while a second control line 14 from the I/O channel 11 is connected to the command register 18. Control line 14 is rendered active by the I/O channel 11 whenever the signal byte on bus 12 represents a command byte, while control line 13 is rendered active by the I/O channel 11 whenever the signal byte on bus 12 represents a data character. Rendering control line 13 active enables the signal byte on bus 12 to pass into register 17, while rendering control line 14 active enables the signal byte on bus 12 to pass into the command register 18. The eight bit output of the data register 17 is applied in parallel over a second eight line bus 19 to a print line buffer memory 21, a code buffer memory 20 and an associative memory 22. Similarly, the eight bit output from the command register 18 is applied over an eight bit bus 18a to the main control circuits 24 of the printer control unit 40. It will be understood that the print line buffer memory 21 and the code buffer memory 20 are both conventional in design and preferably include as indicated in U.S. Pat. Nos. 3,282,205 or 3,349,695 the usual memory addressing and read/write control circuits. The associative memory 22 corresponds, for example, to that shown in my above-identified application Serial Number 396,636. The print line buffer memory 21 stores the data characters to be printed on a print line and therefore has as many memory locations as there are columns in a print line, typically 160. Similarly, the code buffer memory 20 stores the coded signal characters representative of the print characters embossed on the print band and has as many storage locations as there are characters on the band, typically 384. Finally, the associative memory 22, which is a one bit per storage location nondestructive read out memory, has as many storage locations as there are possible codes or combination of bits in a signal byte ($2^8$ or 256 locations).

The eight bit output of the print line buffer memory 21 is applied over an eight bit signal bus 21a to one eight bit input of a conventional comparator 32 while the eight bit output of the code buffer memory 20 is applied over an eight bit bus 20a to the other eight bit input of the comparator 32. The comparator 32 activates its output line 43 whenever the signal bytes being simultaneously read out from buffer memories 20 and 21 correspond. The output signal on line 43 from the comparator 32 is applied through a print AND gate 28 to the print hammer actuation circuits in the printer mechanism 31 as illustrated, for example, in U.S. Pat. No. 2,993,437, and also through an OR gate 29 to the stepping input of a Match Counter 30. The Match Counter 30 counts the number of equal comparisons coming from the comparator 32 and activates an output signal line 33 whenever its stepping input from OR gate 29 has received 160 pulses (i.e., a number of stepping pulses equal to the number of columns in a print line). The output signal on line 33 of the Match Counter, which may be designated a Print End signal, is applied to the main printer control circuits 24. The control circuits 24, are conventional in design. They may, for example, correspond to that shown in U.S. Pat. No. 3,400,371 and typically include a command decoder, various status and control flip-flops, byte counters, etc. Control circuits 24 also include an output bus 15 and a set of control lines represented at 16 which connect the control unit 40 to the I/O channel 11 of the Central Processor 10. Bus 15, which may be an eight line signal bus, transmits such information as the printer address, status, etc. back to the I/O channel 11. The control lines 16, which are also referred to as tag lines are activated to identify the nature of the information on bus 15. The control circuits 24 provide decoded output signals on a number of output lines such as 41 and 42 in dependence upon the command received from the I/O channel 11. More specifically, line 42 is activated during a load command when the code buffer 20 is being filled with the codes representing the print characters formed on the type band. Similarly the decode line 41 is rendered active during the print command and output line 44 is rendered active during the print cycle when printing actually occurs.

The operation of FIG. 1 is as follows: During printer start-up, the Central Processor 10 transmits a load command byte, as shown in FIG. 4, to the printer control unit 40 over the bus 12. At this time the control line 14 is activated and the load command byte is gated into the command register 18 to activate output line 42 of the control circuits 24. Activation of output line 42 places the code buffer memory 20 in a write condition and, as described in my copending application, supra, causes the associative memory control circuits 23 to activate its clear line 25 which in turn causes each of the 256 one bit memory locations within the associative memory 22 to be cleared to zero. After the command byte (FIG. 4) has been stored in the command register 18, the I/O channel 11 transmits a series of code bytes No. 1 to No. n to the control unit 40. These bytes are data representing the print characters, typically 384 characters, on the type band of the printer. At the same time as each signal byte is transmitted, the I/O channel 11 activates the control line 13 as shown by waveform B, FIG. 4, to gate the successive signal bytes No. 1 to No. n into the data register 17. The output of this register is applied via bus 19 in parallel to the input of the code buffer 20, where the received data, indicating print characters are stored in successive memory locations, and to the addressing input of the associative memory 22. Each received coded byte is decoded in the associative memory 22 and addresses a one bit storage location within the memory 22 which corresponds to the code of the received signal byte. During this phase of the operation, the associative memory control circuits 23, under the control of the load line 42, activates its write output 27 to cause a binary one to be written into each location of the memory 22 which is addressed by the received code bytes No. 1 to No. n. Thus at the end of the execution of a load command the code for each character on the type band is stored in the code buffer 20 is the same sequence as the characters appear on the type band; and a binary one is written into each addressed location of associative memory 22 corresponding to the codes stored in buffer 20. In the present example where 48 different characters comprise a font, 48 different codes are used and hence 48 different memory locations within memory 22 are set to a binary 1 condition. The remaining 208 address locations in memory 22 remain set to binary zero. Thus every address location in memory 22 storing a binary one represents a printable character since that character appears on the type band while every address location in memory 22 which stores a binary zero represents a non-printable or data check character.

At the end of the execution of the load command the program within the Central Processor 10 causes the I/O channel 11 to transmit a print command to the control unit 40 over the bus 12. Again, when the print command byte is being transmitted, the control line 14 is activated to cause the command byte to be stored in the command register 18. The print command now being stored in register 18 causes the command decoder within the printer control circuits 24 to activate its output line 41 which in turn places the print line buffer 21 in a write condition. Activation of line 41 also causes the associative memory control circuits 23 to activate its read output line 26 to place memory 22 in a read condition. Following the print command byte, the I/O channel 11 transmits via bus 12 a series of data bytes No. 1 to No. n, again as indicated in FIG. 4. These signal bytes correspond to the line of data characters to be printed, in the assumed example 160 data characters. Again, the control line 13 is activated as each data byte is transmitted over bus 12 to cause each of the received print line data bytes to be stored in the data register 17. The output from data register 17 is applied to the input circuits of the print line buffer 21 where they are stored in successive memory locations. As the data bytes appearing on bus 19 are being stored in printline buffer 21, they are also being applied to the addressing circuits of associative memory 22 to cause read out therefrom. Thus as each received print line data character is being stored in buffer 21 it automatically and simultaneously reads out the bit stored in the corresponding memory location of memory 22. Those print line data characters which are printable, i.e., address locations within the memory 22 which store a binary one, produce an output on line 39 of the associative memory 22 which is of a first voltage level, while those print line data characters, which are non-printable, i.e., address locations within memory 22 which store a binary zero produce an output on line 39 of the memory 22 which is of a second voltage level. The output voltage level on line 39 when the second level (a binary zero) is being read from the associative memory 22 passes through the OR gate 29 to the stepping input of the Match Counter 30. Thus each non-printable character appearing in the line to be printed steps the counter 30 so that when a complete line of data has been loaded into the print line buffer 21 all of the non-printables have been accounted for. That is, counter 30 has been stepped a number of times equal to the number of non-printables in the line of print data. At the end of this cycle, when the buffer 21 has been filled, the control circuits 24 activate its control line 44 to in turn activate print gate 28 and also to place the code and print line buffer memories 20 and 21 in a read out condition. During this phase, the print line data stored in the print line buffer 21 and the codes stored in code buffer 20 are read out in synchronism with the positioning of the type band and compared in comparator 32. Each time a data character read from the print line buffer 21 matches the code being read from code buffer 20, comparator 32 produces an output signal on its output 43. This output is gated through the print gate 28 to the print mechanism 31 to cause printing and also through OR gate 29 to step the Match Counter 30. When the Match Counter has been stepped 160 counts (this includes the number of non-printable characters counted as the print line buffer 21 was being filled) it produces an output on line 33 to indicate the end of the print cycle. Activating line 33 causes the control circuits 24, for example, to activate a service in control line 15 and to transmit a status bit over bus 16 to the Central Processor to indicate the end of the print cycle.

From the foregoing description it will be recognized that each non-printable character stored in the print line buffer 21 is accounted for by stepping the Match Counter 30 via the operation of the associative memory 22. It will also be recognized, however, that each non-printable character will appear as a space in the printed output since there are no codes stored in the code buffer 20 which match the non-printables stored in the print line buffer 21. In contrast, the present invention operates to insert predetermined printable characters in the non-printable spaces to thereby provide a means for identifying the non-printable characters. To achieve this objective, the code for each non-printable character stored in the print line buffer 21 may be selectively paired, as hereinabove indicated, with a code for any of the printable characters stored in the code buffer 20. From our example above this would mean that the non-printable character i.e., small case l would be paired with a printable character such as numeral one (1). The pairing is program selectable and permits any one or group of non-printable characters to have its paired character printed in its place. To effect the pairing, the code bytes No. 1 to No. $n$ transmitted with the load command have been expanded to include a first group of printable character code bytes each paired with a non-printable character code byte. These code bytes are stored in a set of storage registers located in the printer control unit. Thereafter the normal array of code bytes which represent the characters on the print band are transmitted to and stored in the code buffer memory 20.

The table below provides an illustrative example of the byte sequence scheduling of the modified load command wherein four non-printable codes are paired with four printable codes.

Table

| Byte No. | Code | Description |
| --- | --- | --- |
| 1 | F3 | Cartridge Verification Code (CVC) |
| 2 | 02 | Printable |
| 3 | 42 | Non Printable Dual |
| 4 | 12 | Printable |
| 5 | 52 | Non Printable Dual |
| 6 | 22 | Printable |
| 7 | 62 | Non Printable Dual |
| 8 | 22 | Printable |
| 9 | 72 | Non Printable Dual |
| 10 | 17 | Data Check Dual |
| 11 | 00 | Space Code |
| 12 to 395 | 01 to 30 | Normal Code Array |

In this table, the first eleven code bytes designated F3 to $\phi\phi$ are transmitted as signal bytes No. 1 to No. 11 of FIG. 4 and are stored in respective storage registers. The next group of codes $\phi 1$ to $3\phi$ form the normal code array for the printer and are stored in the code buffer memory 20. In the table each 8 bit code byte is represented by two hexadecimal characters. In more particular each 8 bit byte is considered to consist of two four bit half bytes; a most significant half (MSH) and a least significant half (LSH). The decimal digits $\phi$ to 9 are used to represent the bit values 0000 to 1001, while the alpha characters A to F are used to represent the bit values 1010 to 1111. Thus the hexadecimal representation F3 in the table represents the 8 bit binary code 11110011; similarly the representation $\phi 2$ represents the code 00000010 and so forth.

For reasons which will become apparent hereinafter, the dualizing codes, bytes No. 2 through No. 9, are transmitted to the printer as follows: first a printable code is transmitted and then its non-printable mate or dual. For instance, the code designated $\phi 2$ is a printable character since it falls in the normal code array, while code 42 is its non-printable mate or dual. Likewise the printable code 12, for example, is followed immediately by its non-printable mate 52. The printable codes and their non-printable mates are arbitrarily assigned to one another by the programmer. For instance, as shown in the table one printable code 22 can be mated with two different non-printable codes 62 and 72.

In the above table the first code byte, byte No. 1, represented as the hexadecimal character F3 is a control byte for the system and corresponds to the verification code described in the copending application of B. McDevitt, Ser. No. 433,624, filed Jan. 16, 1974. In accordance with the McDevitt application, the type member (band) of the printer carries a coded identification tag which is read from the type member and stored in a first register. The first code character in the load command is a verification code which is stored in a second register. The codes stored in the first and second registers are compared. If the identification and verification codes do not match printing is inhibited. The purpose of this comparison is to interlock the codes of the "load" command with the characters on the type member. This insures that the type band, which is an interchangeable unit, it the correct band for the codes utilized by the load command. In the present invention, use is made of the verification code to selectively initiate the code dualizing operation of the present invention. This is done, as will later be described, by sensing the eighth bit of the verification code. If the eighth bit is a one, code pairing is utilized during printing; if, however, the eighth bit is a 0, normal operation occurs and the non-printable characters appear as spaces. With the present concept then only the first seven bits of the verification code are used for comparison purposes in the McDevitt verification system. To further illustrate, by using only the first seven bits for comparison purposes, a verification code, for example, of 73 hexadecimal normal operation of the printer since in the ehexadecimal system 73 = 01110011; while a verification code of F3 causes a code pairing operation to occur. (F3 = 11110011).

In the table the tenth code, 17, is a data check dual code and its purpose, as will be described, is to cause all the data check or non-printable codes not included in the pairing operation (bytes No. 2 through No. 9) to be printed as a common character whose code corresponds to the hexadecimal character 17. Here again the character so printed is arbitrarily selectable by the programmer. Finally in the table the 11th byte $\phi\phi$ represents the space code in the code format utilized by the printer. This code like the codes before it is stored in a special register and wherever the print line buffer contains the space code it will cause the Match Counter 30 to be stepped and a space to appear in the print line.

Figure 2:
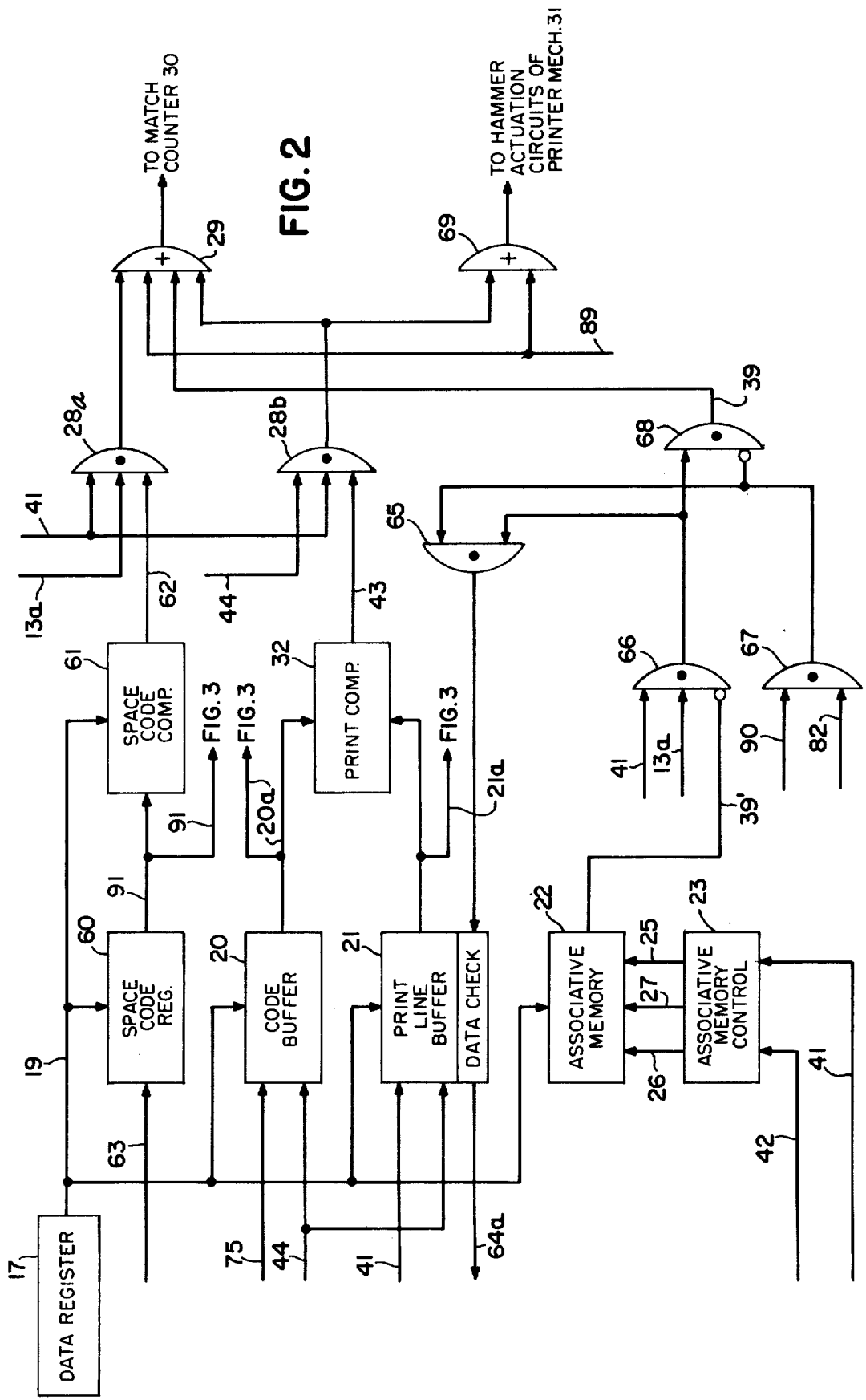
Figure 3:
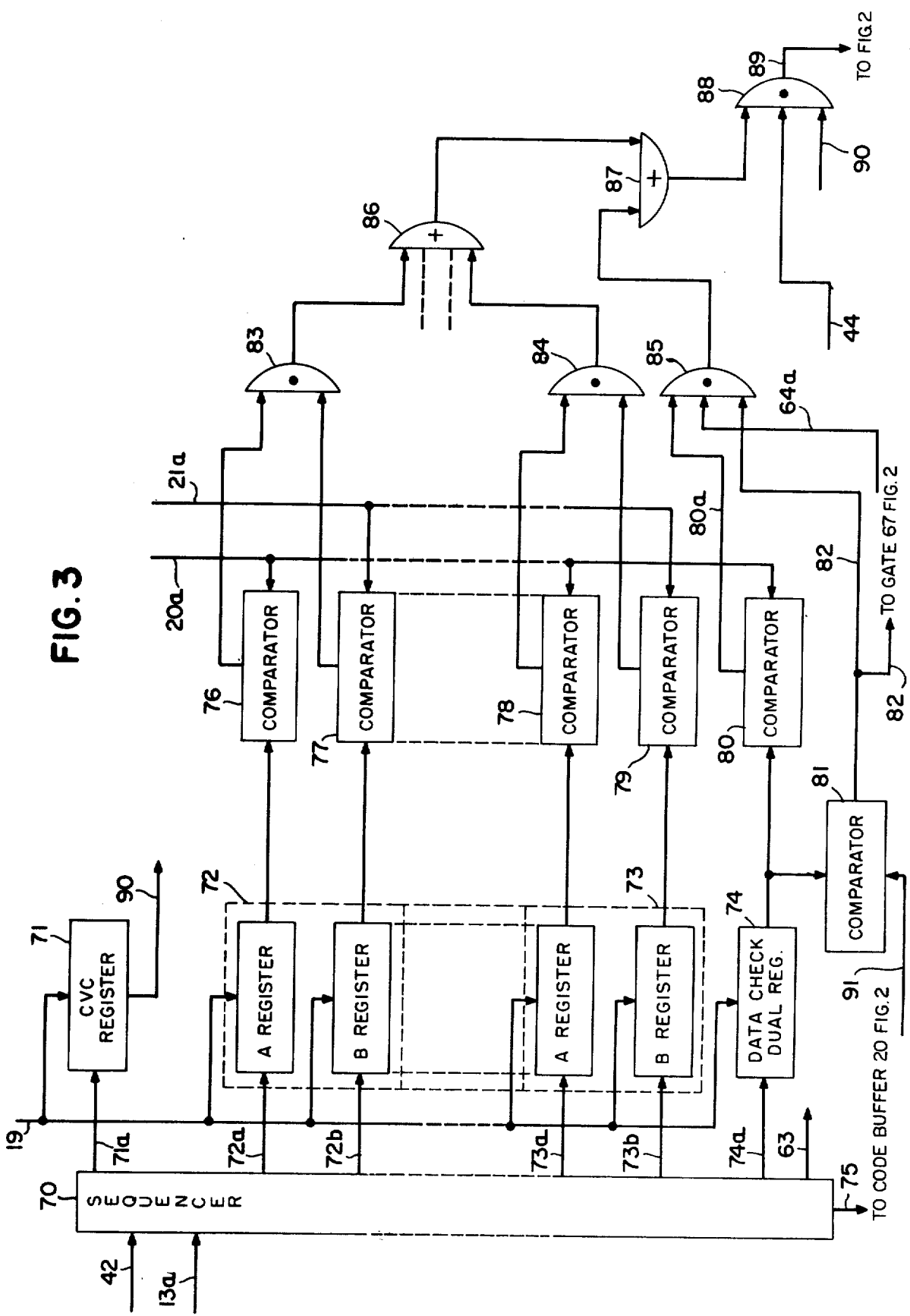
Figure 7:
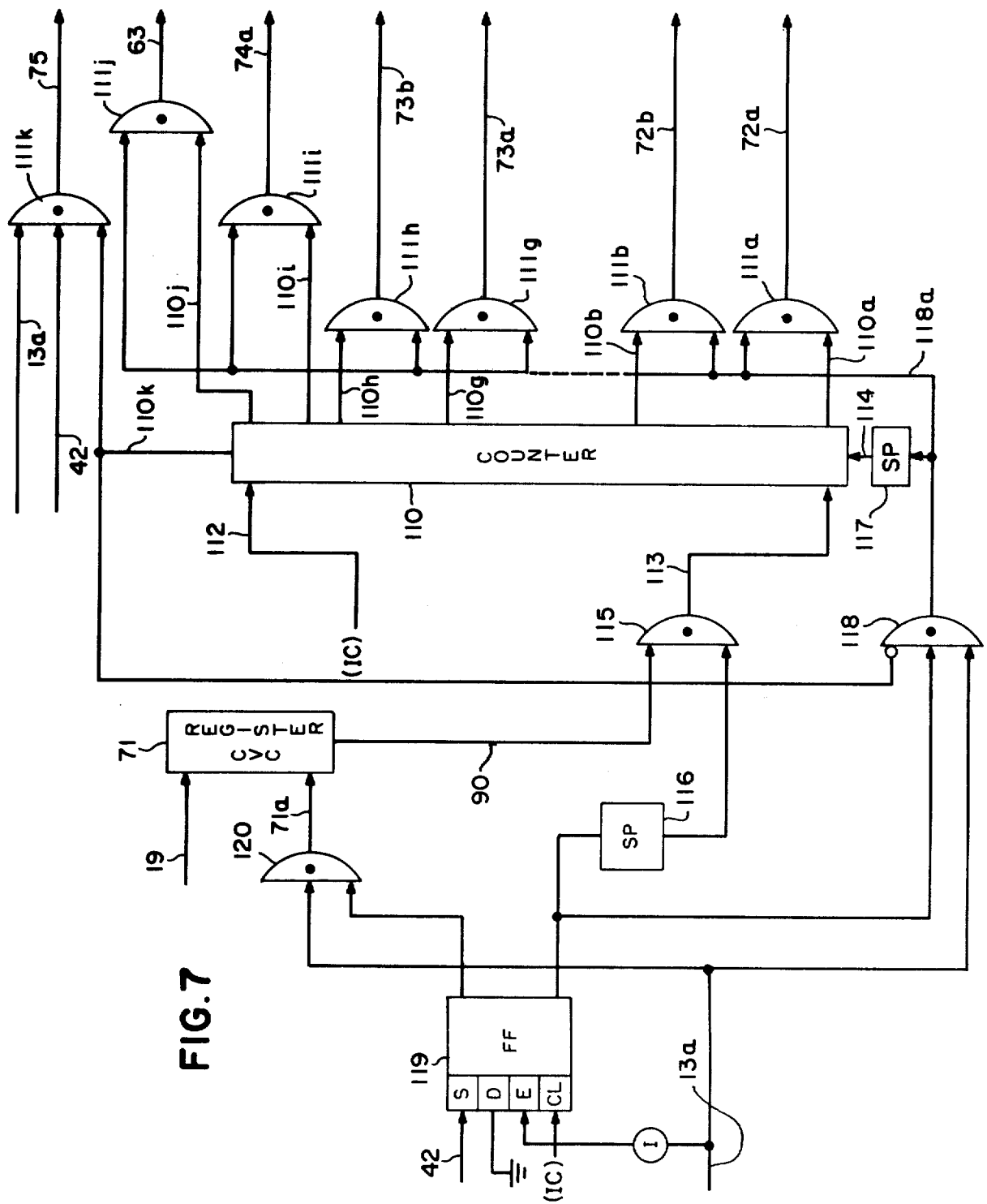
FIG. 7 is a block diagram of a representative type of sequencer device shown at 70 in FIG. 3.

Reference will now be made to FIGS. 2 and 3 where the logic needed to implement my invention has been added to the environment of FIG. 1. In FIGS. 1, 2 and 3, the common portions have been indicated by common reference numerals. Referring first to FIG. 2, it will be recognized that the data register 17, the code buffer 20, the print buffer 21, the associative memory 22 and its controls 23, and the print comparator 32 of FIG. 1 have all been reproduced herein to better show the logic added by the present invention. Added to the logic of FIG. 1 as shown in FIG. 2 is, inter alia, a space code register 60 and a space code comparator 61. The former is a conventional 8 bit flip-flop register the eight bit signal input to which is connected to the output bus 19 of the data register 17 while its input gating terminal is connected to an output terminal 63 of the sequencer 70 of FIG. 3. The sequencer 70, as will be described in connection with FIG. 7, is a device which, when the present invention is being utilized, is rendered operative during a load command to switch the first eleven signal bytes of the above table into a set of respective storage registers and the normal code array into the code storage buffer memory 20. In this respect, the output terminal 63 of the sequencer 70 is, as will be described, rendered active during the receipt of the space code byte of the load command so as to effect storage of the space code in register 60.

The space code comparator 61 is conventional and is similar to the print comparator 32. It has two sets of eight line inputs connected thereto, one of which is connected to the output bus 19 of the data register 17 and the second of which is connected to the eight output lines 91 of the space code register 60. The purpose of the space code comparator is to detect the appearance of spaces in the line of print data and to step the Match Counter 30 each time a space is detected in the print line data. Thus, in operation, the space code comparator 61 compares the space code stored in register 60 against the print line data as it is being stored in the print line buffer 21 from bus 19. Whenever the print line data includes a space code, the comparator 61 produces an output signal on line 62 to activate AND gate 28a and thereby permit a strobe pulse on line 13a to pass through AND gate 28a and OR gate 29 to step the Match Counter 30. In FIG. 2, the print gate 28 of FIG. 1, has been shown as two separate gates 28a and 28b while the OR gate 29 of FIG. 1 has been shown as having a larger number of inputs thereto. Gate 28a which receives the output signal on line 62 from the space code comparator is conditioned by the print command signal from line 41 of the control circuits 24 of FIG. 1. Line 41, it will be recalled, is active during the execution of the print command. Gate 28a also receives over line 13a a strobe signal such as is shown by waveform B of FIG. 4 each time a data byte is received from the Processor 10 of FIG. 1. The strobe signal may be derived, for example, from the control line 13 from the Central Processor 10 which line is rendered active by the Central Processor 10 each time the Processor sends a data byte to the printer. The circuit for generating the strobe signal is not critical and can be little more than an amplifier shaper circuit such as shown in FIG. 5.

While not, per se, forming part of my invention, my invention does utilize the cartridge code verification register of the above McDevitt application as shown at 71 in FIG. 3. This register like the other registers 72, 73 and 74 shown in this figure are conventional 8 stage flip-flop storage registers the signal inputs to which are coupled to the output bus 19 of the data register 17.

The gating terminal of the CVC Register 71 is connected to the output terminal 71a of the sequencer 70. Terminal 71a, as will be described, is rendered active during receipt of the 1st code byte of the above table thereby to cause the verification code to be stored in the CVC register 71. This register has an output lead 90 taken from its 8th stage. Output lead 90 will be considered active whenever the 8th bit stored in register 71 is a binary 1 and inactive whenever the 8th bit is a binary 0. As is described in the above-mentioned McDevitt application, the 8th bit is made a binary 1 whenever, the programmer wishes to bring the present invention into operation.

Also added to the logic of FIG. 1, as shown by FIG. 3, are four pairs of registers only the first and last pairs of which are shown at 72 and 73. Each pair of registers is provided to store one pair of printable and non-printable character mates as represented by signal bytes No. 2 through No. 9 in the above table. In more particular, the 8 signal input terminals of the A and B registers of each pair is connected to the bus 19 while the respective gating input terminals of the registers are connected to successive output terminals 72a through 73b of the sequencer 70. The sequencer 70 operates to cause the A register of the first pair of registers 72 to store the printable code byte No. 2 of the above table; the A register of the second pair, to store the printable code byte No. 4; the A register of the third pair to store the printable code Byte No. 6 and the A register of the fourth pair to store the printable code byte No. 8. Similarly, the sequencer 70 operates to cause the B registers of the first to the fourth pair to store the non-printable code bytes No. 3, No. 5, No. 7 and No. 9 respectively of the above table.

A data check dual register 74 is added to store the 10th signal byte of the above table. The signal input terminals of this register are connected to the data bus 19 and its gating input to the 10th terminal 74a of the sequencer 70. The data check dual byte, as the other eight bytes stored in the four pairs of registers represented at 72 and 73, is selected by the programmer and can be any of the printable codes within the normal code array or the space code stored in register 60. The 8 bit output of the data check dual register 74 is connected as one input to a first comparator 81, the second input to which is derived from the 8 bit output 91 of the space code register 60. The comparator 81 compares the space code against the data check dual code and produces an active output on line 82 when these codes are chosen to be not equal. The eight bit output from the data check dual register 74 is also connected as one input to a second comparator 80 the other 8 bit input to which is derived from the output 20a of the code buffer memory 20. The output 80a of comparator 80 is rendered active whenever the code stored in the data check dual register 74 matches the code being read from the code buffer memory 20. The outputs 80a and 82 from comparators 80 and 81 respectively are applied, for reasons later explained, to an AND gate 85.

The 8 bit outputs from each of the four register pairs represented at 72 and 73 are applied as one input to a respective one of eight comparators represented at 76 through 79. The other input to the comparators 76 through 79 is derived from the output 20a of the code buffer memory 20 or the output 21a of the print line buffer memory 21. More specifically, the comparators 76–78 connected to the A registers of each register pair 72–73 are connected to the output 20a of the code buffer memory 20 while the comparators 77–79 connected to the outputs of the B registers of the register pairs 72–73 are connected to the output 21a from the print line buffer memory 21. Thus the four A register comparators 76–78 with the associated A registers form a printable data character detection means and operate to compare the printable codes stored in the respective A registers against the codes stored in the code buffer memory 20 and each time a match occurs the output from the comparator detecting the match becomes active. It should be understood that other forms of logic can be used. Similarly, the four B register comparators 77–79 with the associated B registers form a non-printable data character detecting means and operate to compare the non-printable codes stored in each of the four B registers against the print line data stored in the print line buffer memory 21 and each time a match occurs the output of the comparator detecting the match becomes active. It should be understood that other forms of logic can be used. The outputs from each of the four pair of comparators 76 and 77 to 78 and 79 are gated together in four respective AND gates only the first and last of which are shown by gates 83 and 84 which gates, along with gates 86, 87, 89 and 69, form a hammer actuating signal means. The output from the four AND gates represented at 83 and 84 are applied through OR gates 86 and 87 to an AND gate 88. The other two inputs to the AND gate 88 are derived from the printing control line 44 of the control circuits 24 and the output line 90 from the CVC register 71. Thus gate 88 will produce an output whenever the printer is in its printing mode (line 44 active) and the programmer has placed the present invention in operation (line 90 active) and one pair of the four pairs of comparators 76 and 77 to 78 and 79 has detected the condition where one of the selected printable characters on the print band (an A register character) occupies the same columnar print position as its non-printable mate (corresponding B register character). The output from gate 88 is applied via line 89 through both OR gates 29 and 69 (FIG. 3) to the Match Counter 30 and the hammer actuation circuits of the printer 31. The gate 88 output signal passing through OR gate 29 steps the Match Counter 30 while its passage through OR gate 69 fires a printer hammer to thereby cause printing of the selected printable code for the detected non-printable mate.

The logic for printing a common data check dual character for the non-printables not represented by the code bytes No. 3, NO. 5, No. 7 and No. 9 of the above table includes a two input control AND gate 67 of FIG. 2. AND gate 67 derives one of its inputs from the output 90 of the CVC register 71 and its second input from the output 82 of the comparator 81 of FIG. 3. Line 90 is made active when the CVC code byte (byte No. 1) is made to contain a 1 bit in its 8th bit position, while line 82 is made active when the data check dual byte (byte No. 10) is made not equal to the space code byte (byte No. 11). When both lines 82 and 90 are active gate 67 produces an output signal which is applied as an inhibit to a first AND gate 68 and as a conditioning signal to a second gate 65. The second input to these latter two gates is in turn derived from the output of gate 66. Gate 66 has three inputs one of which is derived from the control line 41 of the control circuits 24 of the printer, the second of which is a strobe signal on line 13a and the third of which is taken from the output line 39' of the associative memory 22. Line 39' is, as described in my above copending application, rendered operative only during the time that the print line buffer memory 21 is being filled with a line of data to be printed. During this time, as each byte of print data is being stored in the print line buffer 21 it also addresses the associative memory 22, via the bus 19, to cause the bit stored in the addressed location to be read out and appear on line 39'. If the bit read out is a 1 it represents one of the codes comprising the code bytes making up the load command. In this case line 39' is considered active and gate 66 is inhibited. If the bit read out of the associative memory 22, however, is a 0 it represents a code character not contained in the load command (a data check character). In this event, gate 66 is not inhibited and the strobe signal on line 13a passes through the gate 66. The output of gate 66 is applied in parallel to a pair of two input AND gates 65 and 68. The other input to these two AND gates is derived from the output of gate 67 such that when gate 67 is active, gate 65 is active and gate 68 is inhibited. Conversely, when gate 67 is inactive gate 65 is rendered inactive and gate 68 is rendered active. Thus the output from gate 66 is passed through either gate 65 or gate 68 in dependence upon the condition of control gate 67. If gate 67 is active (which is the condition if the features of the present invention are being used) the output of gate 66 (data check characters) is passed through gate 65. If gate 67 is inactive (which is the condition obtained during a normal print operation where data check characters are made to appear as spaces) the output of gate 66 is passed through gate 68. The output of the latter gate is passed via line 39 and OR gate 29 to the stepping input of the Match Counter 30 to thus step the counter 30 for each data check character while an output from the former gate 65 is applied to the write input of a data check memory plane 64. The memory plane 64 has as many memory locations as there are memory locations in the print line buffer 21. Each location stores a single binary bit and is addressed by the print line buffer memory 21 addressing circuits so that when the print line buffer 21 is being filled with data and the control line 41 is active, the write circuits of both the print line buffer 21 and the data check memory plane 64 are operative. At this time gate 65, when active, operates to store a binary 1 in each location of the memory plane 64 that corresponds to the storage of a non-printable code in the print line buffer 21. All other positions in the plane 64 store binary 0s. Then during the printing cycle when printing occurs (line 44 is made active) and both the print line buffer 21 and the memory plane 64 are placed in a read out condition. Thus during this cycle the output line 64a of memory plane 64 becomes active each time a storage location within plane 64 storing a binary 1 is read out. The output 64a is applied to gate 85 (FIG. 3). Gate 85 is active whenever a data check dual character other than a space code is stored in register 74 (line 82 active) and the chosen data check dual character on the print band has been moved into a print position. The output of gate 85 is applied through the OR gate 87 and AND gate 88 to the inputs of OR gates 29 and 69 (FIG. 2) to step the Match Counter 30 and fire a print hammer in the printer mechanism 31.

This completes the organizational description of FIGS. 2 and 3 and the operation of these figures will be summarized after the ensuing description of FIGS. 6 and 7.

Refer first to FIG. 6. This figure shows an illustrative embodiment of that portion of the control circuits 24 for generating the various control signals utilized by the printer and referred to hereinabove. As herein illustrated, the control circuits include the command register 18, the 8 bit output of which is applied to a decoding matrix 24a. The decoding matrix 24a is conventional and has a number of output lines only two of which 41 and 42 are shown. Decoder 24a operates to selectively activate one of its output lines in dependence upon the command byte stored in register 18. For example, if the command register is storing a load command byte, load line 42 is activated while if command register 18 stores a print command, line 41 is rendered active. Thus, the print and load signals (lines 41 and 42) may be generated directly from the output of the decoder 24a. The printing signal on line 44 may be derived from a flip-flop 101 as will now be described. This signal, it will be recalled, is generated after the print line buffer 21 has been filled with a line of data and printing is about to occur. The print line buffer full condition may be detected by a byte counter 100 connected to the write input circuits of the print line buffer 21. In more particular, the byte counter 100 has its stepping input OR connected via line 102a to the 8 bit inputs of the print line buffer 21 so that as the bytes comprising a line of data are being written into the print line buffer 21 via the write input gates 102 each data byte steps the counter 100. After the counter has been stepped to a count corresponding to the number of print positions (160 in the assumed example) counter 100 produces an output on its output line 100a to set flip-flop 101 and activate output line 44. The signal on line 44 as previously described activates gate 28b (FIG. 2) and gate 88 (FIG. 3) to enable printing and to step the Match Counter during printing. The Match Counter 30 has its output coupled to the clear terminals of counter 100 and flip-flop 101 so that after the Match Counter has been stepped 160 times it clears flip-flop 101 and counter 100 to terminate the printing signal on line 44.

An illustrative embodiment of the sequencer 70 will now be described in connection with FIG. 7. Functionally, the sequencer 70 must be able to respond to the presence of a binary 1 in the 8th bit position of the CVC register 71 to switch each of the code bytes No. 2 to No. 11 of the above table to a respective storage register and the normal code array into the code buffer memory 20. The sequencer 70 must also be able to recognize a binary 0 in the 8th bit of the CVC register 71 as being a condition where the non-printables in the print line data are made to appear as spaces. In this case the load command does not contain the bytes No. 2 through No. 10 of the above table, but it does contain the eleventh or space code byte and the normal code array. Accordingly, in the event the CVC byte contains a 0 in its 8th bit position, the sequencer must respond by sending the next byte of the load command, which is the space code, into the space code register 60 and the subsequent bytes into the code buffer memory 20.

Referring specifically to FIG. 7 it will be seen that the sequencer 70 includes a counter 110 which in the present embodiment is an eleven position counter. Counter 110 has eleven output taps 110a through 110k, one for each count position. The output taps of the counter are actuated in sequence as the counter is stepped through its eleven count positions so that when the counter is in its first count position output tap 110a is active and when it is in its second count position tap 110b is active and so on until tap 110k becomes active when the counter is in its eleventh count position.

Each of the output taps 110a to 110k is connected to the input of a corresponding one of eleven AND gates 111a to 111k the outputs from which are connected to the gating inputs of the respective code storage registers shown in FIGS. 2 and 3. For example the output of gate 111a connects to the gating input terminal 72a of the A register of register pair 72 shown in FIG. 3. Similarly, gates 111b to 111h connect to the gating inputs of the remaining register pairs as indicated, while gate 111i is connected to gating input 74a of the data check register 74; gate 111j to the gating input 63 of the space code register 60, and finally gate 111k to the gating input 75 of the code buffer 20. Counter 110, in addition to its eleven output taps, has a pair of input jamming terminals 112 and 113 and a stepping input 114. The jamming input 112 is connected to the initial clear line (IC) for the printer and when this line is rendered active, as at the start of a print operation, the counter 110 is jammed to its 10th count position where output tap 110j and therefore gate 111j is active. The output of gate 111j is connected to the gating input of the space code register 60. The second jamming input 113 is connected to the output of a two input AND gate 115 which when active operates to jam the counter 110 to its first count position where output terminal 110a and therefore gate 111a is active. [The output of gate 111a is connected to the gating input 72a of the A register of the first register pair 72.] The inputs to gate 115 are derived from the 8th bit position of the CVC register 71 via line 90 and from the output of a single pulser 116. The stepping input 114 of the counter 110 is connected to the output of a second single pulser 117 the input to which is derived from the output of AND gate 118. AND gate 118 has the first input thereto connected to the strobe line 13a; its second input connected to the clear or reset output of flip-flop 119, and its final input which is an inhibit input connected to the final output terminal 110k of the counter 110. The flip-flop 119 is preferably of the type described in the 1973 Texas Instruments' Catalog and identified as type number SN 7474. This flip-flop has a set input (S), a data input (D), an edge triggering input (E) and a clear input (CL). The set input is connected to the load line 42 output from the decoder 24a shown in FIG. 6. The clear input (CL) is connected to the initial clear line (IC) of the printer and the edge triggering input is connected through an inverter I to the strobe line 13a.

The operation of the circuit of FIG. 7 will now be described. First assume that the flip-flop 119 has been cleared by an IC signal and that the counter 110 has been jammed to its 10th count position by the same initial clear signal IC. Next assume that the load command byte has been stored in the command register 18 and output line 42 of the decoder 24a has been made active. Output line 42 sets flip-flop 119 to thus activate gate 120 and deactivate gate 118. The first code byte received on bus 19 is always the CVC code. At strobe time, waveform B of FIG. 4, line 13a 13a active to cause the output of gate 120 to gate the CVC code byte into register 71. The trailing edge of the same strobe pulse on line 13a acts via inverter I to reset the flip-flop 119. Resetting flip-flop 119 activates the gate 118 and at the same time triggers the single pulser 116. The single pulser strobes gate 115. If the 8th bit of the CVC code stored in register 71 is a binary 1 line 90 and therefore gate 115 is active and the output of gate 115 jams counter 110 to its first count position. If the 8th bit position of the CVC code is a binary 0 line 90 is inactive and gate 115 is inactive so that the counter 110 remains in its tenth count position where gate 111*j* is active.

Assume that the programmer has elected not to use the features of this invention. In this event the CVC code is selected to contain a binary 0 in the 8th bit position. Gate 115 is thus held inactive and the counter 110 remains set to its 10th count position where the counter output gate 111*j* is active. In this mode, the next code byte transmitted during the load command is the space code. When this code is transmitted, the accompanying strobe pulse appearing on line 13*a* passes through gate 118 and is applied to the active counter output gate 111*j* via line 118*a*. The strobe pulse appearing on line 118*a* acts via gate 111*j* to gate the space code present on bus 19 into the space code register 60 and to trigger the single pulser 117 by its trailing edge. The single pulser 117 steps the counter 110 to its next count position where gate 111*k* is rendered active and gate 118 is inhibited. Inhibiting gate 118 stops further stepping of the counter 110 and holds gate 111*k* open whereby the strobe signals appearing on line 13*a* operate through gate 111*k* to gate the code bytes forming the normal code array into the code buffer memory 20.

Now assume that the programmer has elected to place the features of the present invention into use. He does so by selecting a CVC code that contains a 1 bit in its 8th bit position and by programming the load command to contain code pairing bytes No. 2 to No. 9 and a data check dual byte (byte No. 10) as well as the space code and normal code array. When this mode of operation is elected, the first strobe pulse on strobe line 13*a* acting through gate 120 causes the CVC code to be gated into the CVC register. This time the output line 90 of the CVC register is made active and gate 115 is therefore also made active. Then when flip-flop 119 is reset at the trailing edge of the first strobe pulse on line 13*a*, single pulser 116 is triggered to set counter 110 to its first count position via gate 115. The flip-flop 119, when reset by the trailing edge of the first strobe pulse, operates to activate gate 118 so that the subsequent strobe pulses on the input line 13*a* pass through gate 118 and appear on the output line 118*a*. The strobe pulses appearing on line 118*a* first strobe the counter output gates 111*a* through 111*j* to produce an output from the active gate of this group and then by their trailing edges trigger the single pulser 117 to step the counter 110. This action is such that the first strobe pulse passing through gate 118 causes code byte No. 2 to be gated into the register of gate pair 72; code byte No. 3 into the B register of gate pair 72 and so on. This action continues until the counter 110 reaches its last count where the gate 111*k* is again rendered active and gate 118 is inhibited. The inhibit on gate 118 again stops the stepping of the counter 110.

Returning now to FIGS. 2 and 3 the operation of my invention will now be summarized. In this summary, let it be first assumed that the programmer has elected to carry out a normal printing operation where data check characters appear in the print line as spaces. In this case the programmer programs the load command so that it includes only the CVC code, the space code, and the normal code array. The CVC code in this case contains a binary 0 in its 8th bit position so that when the load command is executed line 90 of the CVC register 71 will be rendered inactive and therefore gate 115 (FIG. 7) will be held inactive. The inactive gate 115 causes the sequencer 70 to start its switching sequence from its 10th count position whereby the loading of register 72 to 74 (FIG. 3) is bypassed. Following the CVC code byte, in the assumed load command, is the space code byte and the normal code array. The space code byte is stored in the space code register 60 and the normal code array is stored in the code buffer memory 20 as described above. Hence at the end of the assumed load command the CVC register 71, the space code register 60, and the code buffer memory 20 will all be loaded with the appropriate code bytes while the registers 72 to 74 will be left in their cleared condition. As the code bytes are being stored, the associative memory 22 will be set to the condition where only those memory locations corresponding to the code bytes comprising the load command will store a binary 1 while all other memory locations therein will remain set to a binary 0. The printer is now in a condition to execute one or more "print" commands wherein all printable characters are printed and all non-printable characters are made to appear as spaces.

Now assume that the program stored within the Processor 10 causes the I/O channel 11 to issue a print command which contains both printable and non-printable code bytes. The issued print command activates the control lines 41 and 44 and also causes the signal bytes forming the print data of the command to be stored in the print line buffer memory 21 as described above. Activating the control line 41 activates gates 66 and 28*a*. Gate 28*a* receives the output 62 of the space code comparator 61. Comparator 61 and hence gate 28*a* produces an output for each space code byte being loaded into the print line buffer memory 21. The output from gate 28*a* passes through the OR gate 29 to step the Match Counter 30 to thereby count the number of spaces in the print line. At the same time that the spaces in a print line are being counted, the other non-printable characters being stored in the print line buffer memory 21 are being counted by sampling the output 39' of the associative memory 22. In more particular, associative memory 22 produces an output on its output line 39' for each non-printable character being stored in the print line buffer 21. These outputs are gated through the active gate 66 and are applied in parallel to gates 65 and 68. The condition of gates 65 and 68 is controlled by the condition of control gate 67 such that when the condition of gate 67 is active gate 65 is held active and gate 68 is held inactive. Conversely when control gate 67 is inactive gate 65 is held inactive and gate 68 is held active. In the presently assumed mode, gate 67 is inactive since the output line 90 of the CVC register has been assumed to be inactive and thus gate 68 is held active. Accordingly, when gate 67 is held inactive, the binary zeros read from associative memory 22 and passing through gate 66 also pass through gate 68 and OR gate 29 to step the Match Counter 30. Since a binary 0 is read from the associative memory 22 each time a non-printable character is stored in the print line buffer 21, the Match Counter 30 will, via the signals passing through gates 28*a*, count the non-printables in the line of data.

The Match Counter 30, having now counted the number of spaces and the other non-printables in a line, need now only count the number of printable characters before it can signal the end of the printing cycle.

Counting of the printable characters is done via gate 28b. Gate 28b is rendered active by the control line 44 and acts to pass the output from the print comparator 32 through the OR gates 29 and 69 to the Match Counter 30 and the print hammers respectively of the printer. Print comparator 32, it will be recalled, produces an output on its output line 43 each time a character on the print band moves into a print position where that character is to be printed. Accordingly, the output from gate 28b operates to step the Match Counter 30 to count the number of printable characters in the line of data.

In the above operation it will be noted that only the printable characters which produce an output from gate 28b produce a printing operation since the output from this gate passes through the OR gate 69 to the print hammers. Contrariwise, the output signals from gate 28a, which occur when spaces are detected, and the output from gate 68, which occurs when non-printables are detected, are not passed through OR gate 69 so no printing occurs in response to these signals.

Now assume that the programmer instead of electing to carry on a normal print operation elects to bring the present invention into operation. He does so by selecting a CVC code which contains a binary 1 in its 8th bit position whereby the output of line 90 from the CVC register 71 is made active upon execution of the load command. In this event gate 115 is made active and the sequencer 70 is jammed to its 1st count position. When the printer is placed in this mode the load command must be made to contain the four pairs of dualizing bytes, bytes No. 2 through No. 9; a data check dual byte, byte No. 10; a space code byte, byte No. 11 and the normal code array. The data check dual code, byte No. 10 can arbitrarily be made equal or unequal to the space code. If it is made equal then only the non-printable characters stored in the B register of the register pairs 72-73 will be printed. If it is made unequal to the space code then all non-printable characters other than the non-printable duals not stored in the B register of the register pairs 72-73 will be printed as the data check dual.

Assume first that the programmer elects to set the data check dual code equal to the space code. In this event the output line 82 from the comparator 81 is inactive to thus hold gate 67 inactive. When gate 67 is held inactive gate 68 is rendered active and therefore the binary zeros read out from the associative memory 22, during the loading of the print line buffer 21, pass through gates 66 and 68 and the OR gate 29 to step the Match Counter 30. As in the previously described operation, after the spaces and non-printable characters have been counted, the control line 44 becomes active to start the actual printing operations. When the control line 44 becomes active it activates gate 88 which in turn passes the gated outputs of the comparator pairs 76-77 to 78-79 through OR gate 29 to the Match Counter 30 and through OR gate 69 to the print hammers to cause printing. The signal outputs from gate 88 passing through OR gate 69 thus cause the non-printables stored in the B registers of the register pairs 72-73 to be printed as their printable mates as previously described.

Now assume that in the above mode the programmer elected to use a data check dual character other than the space code. In this event the output 82 of the comparator 81 would be active since the data check dual would not be equal to the space code. An active condition on line 82 together with an active output 90 from the CVC register 71 activates the control gate 67 whereby the non-printable outputs from the associative memory 22 are passed through gate 66 and gate 65 to the input of the data check memory plane 64. In more particular, each time a binary 0 is read from the associative memory 22 it passes through gates 66 and 65 to record a binary 1 in the data check memory plane 64. The binary 1 s written in the plane 64 thus represent the columnar position in the print columns where each non-printable or data check character appears. Then during the actual print cycle the binary 1 s read from the memory plane 64 are applied to gate 85 via line 64a. This gate also receives the output from the comparator 80 which compares the data check dual character stored in register 74 against the output code from the code buffer 20. The comparator 80 produces an output on line 80a each time the data check dual character on the print band moves into a printing position, and whenever this output corresponds in time to a 1 bit being read from the memory plane 64 an output is produced from gate 85. The output from gate 85 passes through OR gate 87 and AND gate 88 to cause printing. In this case the non-printable or data check characters are printed as the data check dual character stored in register 74.

From the foregoing description it will be noted that the present invention provides a very flexible arrangement. For example in addition to utilizing the above-described printer modes, the programmer can print all non-printables as a single common data check dual. In this mode, the programmer loads the selected data check dual character in the data check dual register 74 and loads all of the A and B register pairs 72-73 with a single printable character code. Similarly, the programmer can elect to print a group of non-printables as a common printable dual simply by loading two or more A registers of the register pairs 72-73 with the common dual character and each of the associated B registers with a respective non-printable code.

What is claimed is:

1. In a high speed printer system which comprises, a print member having printable data characters thereon and arranged for cyclically moving a predetermined set of printable data characters past each position in a print line, print hammer means operable when actuated to cause a printable data character on said print member to contact a print paper, and a data source for supplying to said printer system a line of data characters to be printed and wherein said line of data characters may include non-printable data characters, the improvement which comprises: non-printable data character detecting means formed to detect the presence of any one of a group of preselected non-printable data characters in said line of data characters supplied by said data source: printable data character detecting means for detecting when each of the printable data characters on said print member is in a printing position: and hammer actuating signal producing means connected to said non-printable data character detecting means and to said printable data character detecting means and formed to provide a print hammer actuation signal whenever a predetermined one of said printable data characters on said print member is in a position to be printed in place of an associated one of said preselected non-printable data characters from the line of data characters supplied by said data source.

2. The improvement of claim 1 wherein said non-printable data character detecting means comprises a group of storage registers each of which stores a different selected non-printable data character and a comparator means for comparing the line of data characters supplied by said data source against the characters stored in said group of storage registers, and wherein said printable data character detecting means comprises a group of storage registers each storing a chosen printable data character and a comparator means for comparing the printable data characters stored in said last mentioned group of registers against the printable data characters on said print member as the same come into a printing position.

3. The improvement of claim 1 wherein said non-printable data character detecting means comprises a non-printable data character selection means for storing selected non-printable data characters to be detected and said printable data character detecting means includes a printable data character selection means for storing a different selected printable data character for each different non-printable data character to be detected.

4. The improvement of claim 3 wherein said non-printable data character selection means comprises a first storage means for storing representations of said selected non-printable data characters and a first comparator means formed and connected to compare said selected non-printable data characters stored in the first storage means against the data characters supplied by said data source and further formed to provide an output signal, and said print character selection means comprises a second storage means for storing representations of each selected printable data character, second comparator means for comparing the selected printable data characters stored in said second storage means against the printable data characters on said print member and formed to provide an output signal when said characters are identical and wherein said hammer actuating signal producing means includes a coincidence detector connected to receive said output signals from said first and second comparator means and which responds to the coincidence of said output signals to produce a hammer actuating signal so that a selected printable data character may be printed in place of a non-printable data character.

* * * * *